United States Patent
Alexander

(10) Patent No.: US 7,254,640 B2
(45) Date of Patent: Aug. 7, 2007

(54) SYSTEM FOR PROVIDING FAULT TOLERANT DATA WAREHOUSING ENVIRONMENT BY TEMPORARY TRANSMITTING DATA TO ALTERNATE DATA WAREHOUSE DURING AN INTERVAL OF PRIMARY DATA WAREHOUSE FAILURE

(75) Inventor: Bruce Alexander, Poulsbo, WA (US)

(73) Assignee: Vigilos, Inc., Seattle, WA (US)

( * ) Notice: Subject to any disclaimer, the term of this patent is extended or adjusted under 35 U.S.C. 154(b) by 853 days.

(21) Appl. No.: 10/411,504

(22) Filed: Apr. 9, 2003

(65) Prior Publication Data

US 2003/0191773 A1  Oct. 9, 2003

Related U.S. Application Data

(60) Provisional application No. 60/371,273, filed on Apr. 9, 2002.

(51) Int. Cl.
*G06F 15/173* (2006.01)
(52) U.S. Cl. .................. 709/239; 709/242; 709/225
(58) Field of Classification Search ............. 709/224, 709/225, 219, 229, 238, 223, 226, 239, 242; 707/102, 103 R; 705/40, 3; 420/87
See application file for complete search history.

(56) References Cited

U.S. PATENT DOCUMENTS

| | | | |
|---|---|---|---|
| 4,216,375 A | 8/1980 | Ulch et al. | |
| 4,218,690 A | 8/1980 | Ulch et al. | |
| 4,581,634 A | 4/1986 | Williams | |
| 4,714,995 A | 12/1987 | Materna et al. | |
| 4,721,954 A | 1/1988 | Mauch | |
| 4,816,658 A | 3/1989 | Khandwala et al. | |
| 4,837,568 A | 6/1989 | Snaper | |
| 4,839,640 A | 6/1989 | Ozer et al. | |

(Continued)

FOREIGN PATENT DOCUMENTS

EP  0804031 A  10/1997

(Continued)

OTHER PUBLICATIONS

EyeCast.com Introduces SchoolCast services for School Safety Officials and Law Enforcement Agencies, Press Release dated Apr. 28, 1999.

(Continued)

*Primary Examiner*—Le Hien Luu
(74) *Attorney, Agent, or Firm*—Christensen O'Connor Johnson Kindness PLLC

(57) ABSTRACT

A method and system utilizing one or more data generating computing devices as default data warehouses in the event of a primary data warehouse failure are provided. A data warehouse provides an environment in which data from one or more data servers in one or more locations, or premises, is aggregated in a central database. In the event of a system failure, in which communication between the data warehouse and one or more servers is disrupted, a warehouse ticket file, stored on secure, distributed ticket servers, is used to identify and initialize at least one of the data servers as a failover data warehouse. Once communication between the premises and its primary data warehouse is restored, the data collected during the failover is transferred to the primary data warehouse and purged from the failover data warehouse.

30 Claims, 8 Drawing Sheets

U.S. PATENT DOCUMENTS

| | | | |
|---|---|---|---|
| 4,962,473 | A | 10/1990 | Crain |
| 4,998,279 | A | 3/1991 | Weiss |
| 5,097,505 | A | 3/1992 | Weiss |
| 5,210,873 | A | 5/1993 | Gay et al. |
| 5,367,624 | A | 11/1994 | Cooper |
| 5,475,375 | A | 12/1995 | Barrett et al. |
| 5,475,378 | A | 12/1995 | Kaarsoo et al. |
| 5,544,062 | A | 8/1996 | Johnston, Jr. |
| RE35,336 | E | 9/1996 | Ulch et al. |
| 5,600,368 | A | 2/1997 | Matthews, III |
| 5,614,890 | A | 3/1997 | Fox |
| 5,629,981 | A | 5/1997 | Nerlikar |
| 5,654,696 | A | 8/1997 | Barrett et al. |
| 5,678,039 | A | 10/1997 | Hinks et al. |
| 5,680,328 | A | 10/1997 | Skorupski et al. |
| 5,682,142 | A | 10/1997 | Loosmore et al. |
| 5,729,471 | A | 3/1998 | Jain et al. |
| 5,742,286 | A | 4/1998 | Kung et al. |
| 5,768,119 | A | 6/1998 | Havekost et al. |
| 5,870,733 | A | 2/1999 | Bass et al. |
| 5,903,455 | A | 5/1999 | Sharpe, Jr. et al. |
| 5,923,264 | A | 7/1999 | Lavelle et al. |
| 5,960,174 | A | 9/1999 | Dew |
| 6,064,723 | A | 5/2000 | Cohn et al. |
| 6,233,588 | B1 | 5/2001 | Marchoili et al. |
| 6,356,949 | B1 | 3/2002 | Katsandres et al. |
| 6,587,857 | B1* | 7/2003 | Carothers et al. ........... 707/102 |
| 7,003,560 | B1* | 2/2006 | Mullen et al. ............. 709/223 |
| 2002/0019945 | A1 | 2/2002 | Houston et al. |
| 2002/0029263 | A1 | 3/2002 | Toyoshima et al. |
| 2002/0044879 | A1* | 4/2002 | Shindo et al. ................ 420/87 |
| 2002/0059423 | A1* | 5/2002 | Leymann et al. .......... 709/226 |
| 2002/0072934 | A1* | 6/2002 | Ross et al. ..................... 705/3 |
| 2002/0116389 | A1* | 8/2002 | Chen et al. ............. 707/103 R |
| 2002/0138427 | A1* | 9/2002 | Trivedi ........................ 705/40 |
| 2003/0191773 | A1* | 10/2003 | Alexander ................. 707/102 |
| 2003/0208572 | A1* | 11/2003 | Shah et al. ................. 709/223 |

FOREIGN PATENT DOCUMENTS

| | | |
|---|---|---|
| WO | WO 97/07486 A | 2/1997 |
| WO | WO 01/28251 | 4/2001 |

OTHER PUBLICATIONS

EyeCast.com Adds 360-degree Continuous Pan Rotation Cameras to It's [sic] EyeView Service, Press Release dated Mar. 15, 1999.

Screen Printing from www.remotecams.com, "Take a Step Into the Future . . . ," printed Sep. 17, 1999.

EyeCast.com, "EyeCast secures deals . . . ," *Washington Business Journal*, Aug. 13-19, 1999, Tech Section, p. 16.

EyeCast.com Announces EyeView Control, Press Release dated Oct. 12, 1998.

EyeCast Announces EyeCapture Services, Press Release dated Jul. 8, 1998.

EyeCast.com, Inc., "Providing Live Interactive Video for Surveillance & Monitoring Over the Internet".

Axis Communications, publication entitled "Axis 200+ Web Camera".

Axis Communications, publication entitled "Axis 240 Camera Server".

Axis Communications, www.axis.se/products/cam_240/, "30 Frames/Second," printed Sep. 28, 1999.

Axis Communications, www.axis.se/products/camera_servers/cam_app_sol.htm, "Network Cameras Applications and Solutions," printed Sep. 28, 1999.

Axis Communications, ww.axis.se/products/camera_servers/cam_fb.html, "Features and Benefits," printed Sep. 28, 1999.

\* cited by examiner

SYSTEM FOR PROVIDING FAULT TOLERANT DATA WAREHOUSING ENVIRONMENT BY TEMPORARY TRANSMITTING DATA TO ALTERNATE DATA WAREHOUSE DURING AN INTERVAL OF PRIMARY DATA WAREHOUSE FAILURE

CROSS-REFERENCE TO RELATED APPLICATION

This application claims the benefit of U.S. Provisional Application No. 60/371,273, entitled System and Method for Providing A Fault-Tolerant Data Warehouse Environment, and filed on Apr. 9, 2002. U.S. Provisional Application No. 60/371,273 is incorporated by reference herein.

FIELD OF THE INVENTION

The present invention relates generally to data storage systems, and in particular, to a method for providing fault-tolerant data warehousing.

BACKGROUND OF THE INVENTION

Generally described, most corporate and governmental entities utilize computer systems, computer networks, and integrated devices that generate vast amounts of electronic data. In some cases, data is generated, processed, and discarded after serving an intended purpose. In other cases, corporate, governmental, or other entities require that data be stored and maintained for future use. Such storage methods and systems may be generically referred to as "archival." Accordingly, many data generating users look for storage solutions that correspond to the type and amount of data to be archived.

A growing category of archival is known as data warehousing. Data warehousing refers to the various activities involved in the acquisition, management, and aggregation of data from various sources into a centralized repository, such as a database. The database may be hosted by one or more servers, at least some of which may be physically proximate. Additionally, the central data warehouse may be a virtualized central repository in which a number of distributed servers pool and share data. In a typical application, a data warehouse stores time-oriented data that may be gathered from disparate sources. Data warehousing may be distinguished from the broader category of data archival in that the data warehouse maintains the stored data in a static manner. Because warehoused data cannot be modified (only added to or deleted) it may be used for analysis over time or by type. The data warehouse may also include metadata used to organize and characterize the data. In addition to the ability to store and retrieve data, many database storage solutions also include some type of data restoration process or system that enable data recovery in the event of a hardware and/or software failure. This is generally referred to as storage recovery. One embodiment for storage recovery relates to "mirrored" storage solutions in which one or more identical, redundant data repositories are maintained to replicate, or mirror, the archived data contained in a primary repository. In the event some or all of the data is lost from the primary repository, one or more complete copies of the data exists in the mirrored storage repositories. Accordingly, mirrored storage solutions provide for data recovery in the event that the primary storage repository fails to replicate previously stored data. However, once the primary storage repository fails, the data warehouse cannot continue to collect new data. Accordingly, any new data transmitted to the data warehouse would be lost, or the data processing system may have to shut down.

One attempt to provide additional data warehouse fault tolerance, referred to generally as failover support, relates to the use of a clustered database to transfer data to an alternate collection point in the event of a primary repository failure. In accordance with this embodiment, a database is installed across two or more servers that are linked together, such that each server in the clustered database is logically viewed as a node on the network. To provide for true failover support, the server nodes do not share processing resources. Environments in which storage and processing resources are not shared between nodes are generally referred to as "shared nothing" architectures. Shared-nothing environments are better suited to large, complex databases supporting unpredictable queries, as in data warehousing. Although a shared-nothing environment potentially allows for continued data collection in the event of a failure, the costs involved in providing and maintaining multiple servers for storage redundancy are prohibitive for many potential users. Accordingly, a clustered database approach may not present an affordable solution for many data warehouse applications.

Therefore, there is a need for a resource-efficient, fault-tolerant solution for data warehousing that will provide continuity of the data warehouse function in the event of a network, hardware, or software failure.

SUMMARY OF THE INVENTION

A method and system utilizing one or more data generating computing devices as default data warehouses in the event of a primary data warehouse failure are provided. A data warehouse provides an environment in which data from one or more data servers in one or more locations, or premises, is aggregated in a central database. In the event of a system failure, in which communication between the data warehouse and one or more servers is disrupted, a warehouse ticket file, stored on secure, distributed ticket servers, is used to identify and initialize at least one of the data servers as a failover data warehouse. Once communication between the premises and its primary data warehouse is restored, the data collected during the failover is transferred to the primary data warehouse and purged from the failover data warehouse.

In accordance with an aspect of the present invention, a fault tolerant data warehousing method is provided. The method may be implemented in a data collection and processing system including two or more premises servers for collecting data and transmitting the data to a primary data warehouse. In accordance with the present invention, a premises server obtains a set of data to be transmitted to a primary data warehouse. The premises server obtains an indication that the primary data warehouse is inoperable to receive the set of data. The premises server then obtains a set of data identifying an alternate data warehouse and transmits the set of data to the identified alternate data warehouse. The alternate data warehouse is selected from the two or more premises servers.

In accordance with a further aspect of the present invention, a method for providing fault tolerant data warehousing is provided. The method is implemented in a data collection and processing system including two or more premises servers for collecting data and transmitting the data to a primary data warehouse. In accordance with the method, a premises server obtains a set of data to be transmitted to a primary data warehouse and an indication that the primary data warehouse is inoperable to receive the set of data. The premises server accesses a database associated with a premises server to obtain an identification of an alternate data warehouse associated with the premises server. The premises server suspends the transmission of data between the premises server and the primary data warehouse and transmits premises data to the alternate data warehouse. The alternate data warehouse is selected from the two or more premises servers.

In accordance with a further aspect of the present invention, a system for providing fault tolerant data warehousing is provided. The system includes two or more premises servers in communication with a number of data generating devices. The premises servers transmit collected data for storage. The system also includes a primary data warehouse for receiving the collected data from the premises servers. The system further includes a database server in communication with the premises server for providing an identification of an alternate data warehouse upon a failure of the primary data warehouse. The alternate data warehouse is selected from the two or more premises servers.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
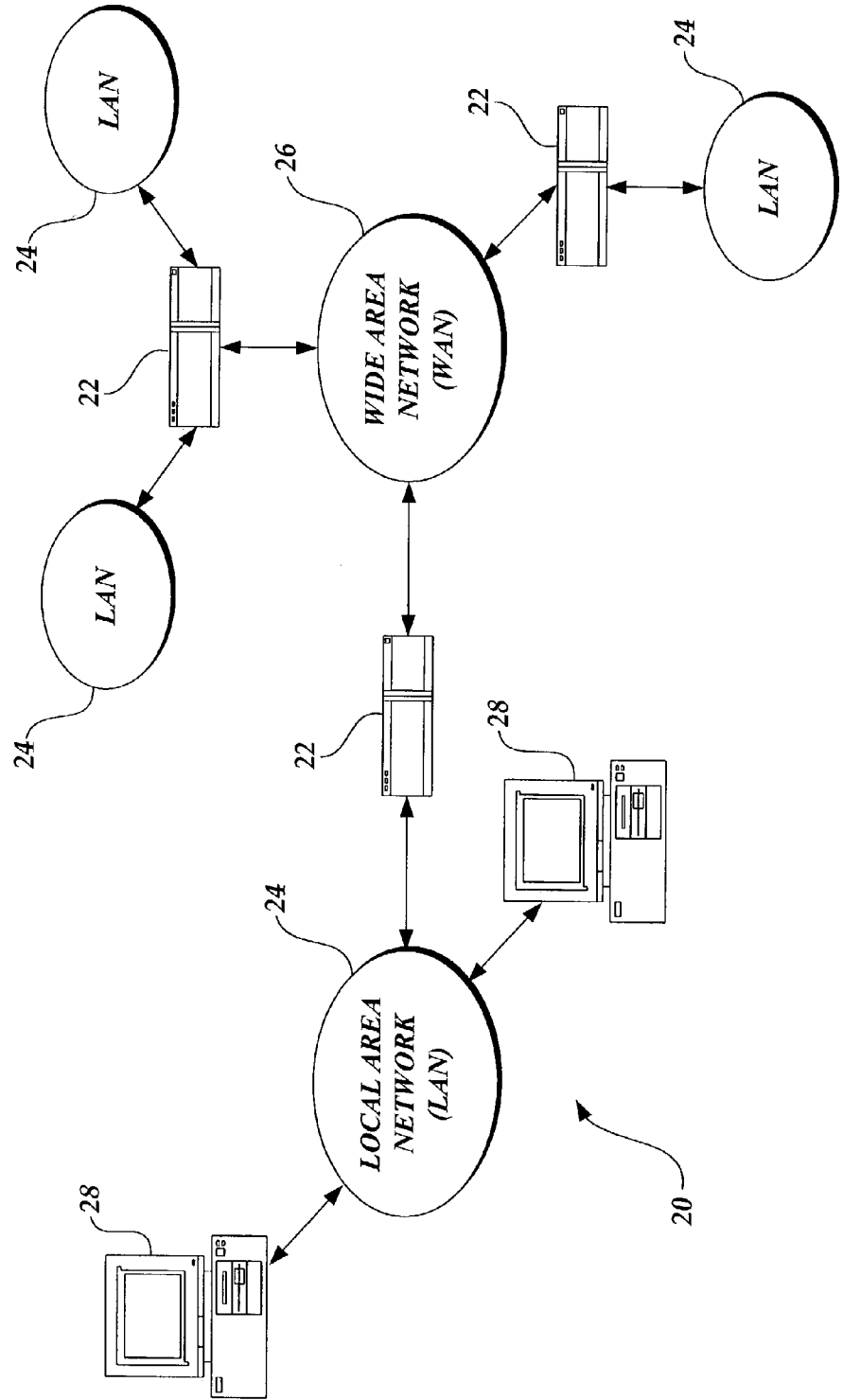
FIG. 1 is a block diagram of a representative portion of the Internet.

As described above, aspects of the present invention may be embodied in a WWW or Web site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a WAN 26 are interconnected by routers 22. The routers 22 are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a digital communications device, modem and temporary telephone, or a wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any Web server, the document is considered retrieved from the World Wide Web. Known to those skilled in the art, a Web server may also include facilities for storing and transmitting application programs, such as application programs written in the JAVA® programming language from Sun Microsystems, for execution on a remote computer. Likewise, a Web server may also include facilities for executing scripts and other application programs on the web server itself.

A remote access user may retrieve hypertext documents from the World Wide Web via a Web browser program. A Web browser, such as Netscape's NAVIGATOR® or Microsoft's Internet Explorer, is a software application program for providing a user interface to the WWW. Upon request from the remote access user via the Web browser, the Web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

Figure 2A:
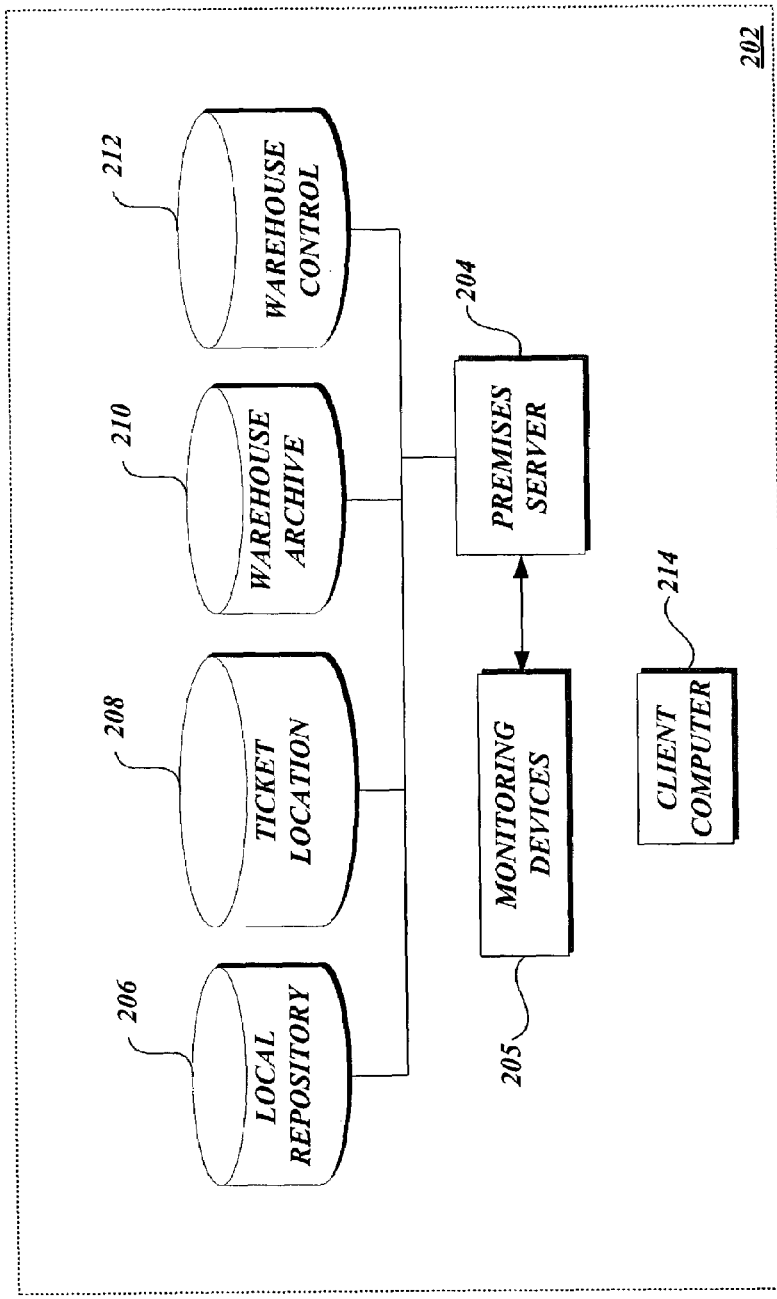
FIG. 2A is a block diagram illustrative of a premises including a premises server, monitoring devices, a number of databases, and a client computer in accordance with the present invention.
Figure 2B:
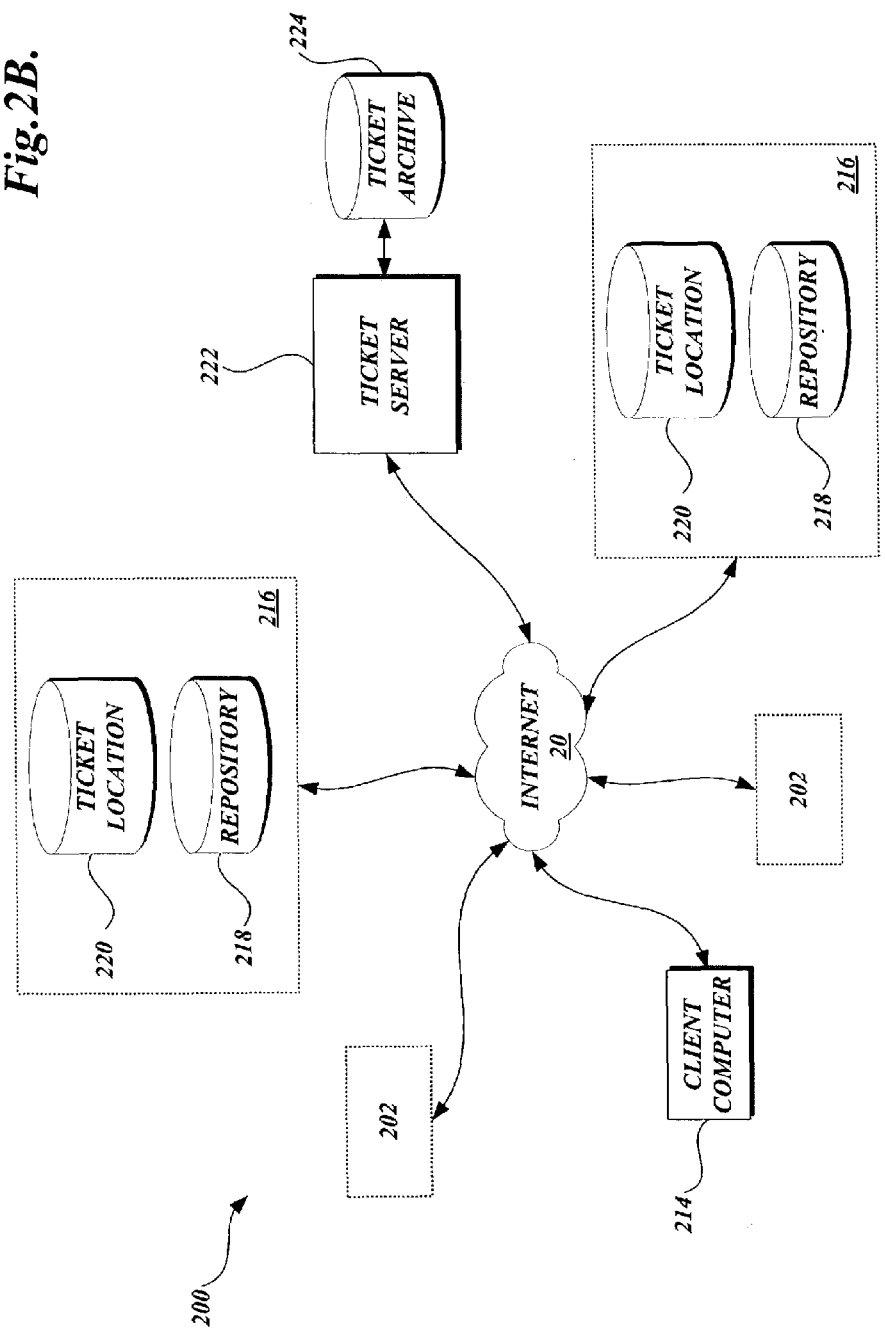
FIG. 2B is a block diagram illustrative of a fault-tolerant data warehouse architecture including one or more premises, one or more data repositories, and at least one ticket server formed in accordance with the present invention.

Referring now to FIGS. 2A and 2B, an actual embodiment of a fault tolerant data warehouse environment 200 formed in accordance with the present invention will be described. In accordance with an illustrative embodiment of the present invention, the fault tolerant data warehouse environment 200 provides for fault tolerant data warehousing functionality. More specifically, the data warehouse environment 200 can provide one or more components operable to direct the transmission of data to an alternate, or substitute, data warehouse repository in response to a system failure or interruption. More specifically, in the event that a system fault prevents the collection of data by a primary data warehouse, the data warehouse environment 200 is operable to designate one or more of the system components as alternative data warehouses and redirect the flow of the data to the alternative data warehouses. Additionally, the data warehouse environment 200 may initiate the redirection of data to an alternative data warehouse upon receipt of a user request. For example, a system administrator may initiate the redirection of data to an alternative data warehouse to provide for maintenance of the primary data warehouse. However, one skilled in the relevant art will appreciate that the fault tolerant data warehouse environment 200 is illustrative in nature and should not be construed as limiting.

With reference now to FIG. 2A, the fault tolerant data warehouse environment 200 includes a number of premises 202, such as a building, or group of buildings, that are associated with an identifiable logical location on a network. Each logical location can generate data to be transferred to a data warehouse, such as for archival purposes. For example, a premises 202 can correspond to a geographic location that can be viewed as a single logical location within the fault tolerant data warehouse environment 200.

In an illustrative embodiment of the present invention, each premises 202 is associated with a premises server 204. The premises server 204 may be local to each premises 202 or otherwise in communication with a premises 202. Each premises server 204 may be in communication with a number of monitoring devices 205 operable to generate data to be archived. In an illustrative embodiment of the present invention, the monitoring devices 205 can include one or more biometric identification devices, including, but not limited to, voice identification devices, image capture devices (e.g., video motion capture and still image capture), microphones, fingerprint identification devices, retinal identification devices, DNA identification devices, and the like. The monitoring devices 205 can also include smoke, fire and carbon monoxide detectors. The monitoring devices 205 can further include door and window access detectors, glass break detectors, motion detectors, audio detectors, metal detectors, explosive detectors and/or infrared detectors. Still further, the monitoring devices 205 may include pressure-sensitive mats or planar surfaces. Still further, the monitoring devices 205 can include conventional panic buttons, global positioning satellite ("GPS") locators, other geographic locators, medical indicators, and vehicle information systems. The monitoring devices 205 can also be integrated with other existing information systems, such as inventory control systems, accounting systems, reservation systems, point-of-sale terminals/systems, and the like. It will be apparent to one skilled in the relevant art that additional or alternative monitoring devices 205 corresponding to a specific monitoring function may be practiced with the present invention. Additionally, the device data can include binary, textual, graphical, and any combination thereof generated by a monitoring device 205. The device data can include raw data originating from a monitoring device 205 or data processed by the monitoring device 205 after it is captured, by the premises server 204, or any other computing device. Additionally, the premises server 204 may obtain data to be archived from other sources, such as third-party monitoring systems, and the like.

The premises server 204 may also be in communication with a local data repository 206, a data warehouse ticket location database 208, a data warehouse identity ticket database 210, and a data warehouse control data database 212. Further, the premises 202 can include a client computer 214 operable to communicate with the premises server 204 and additional components of the fault tolerant data warehouse environment 200.

With reference now to FIG. 2B, the fault tolerant data warehouse environment 200 may also include a number of data warehouses 216 that are operable to obtain and store data from the premises servers 204 of the environment and that are physically, and or logically, remote from a premises server. In an illustrative embodiment of the present invention, the premises server 204 may interact, such as sending and receiving data, with a single data warehouse 216 at one time. Conversely, a data warehouse 216 may interact, or otherwise be associated, with multiple premises servers 204. In an illustrative embodiment of the present invention, the data warehouse 216 may maintain a data repository 218 and a data warehouse ticket location database 220.

With continued reference to FIG. 2B, the fault tolerant data warehouse environment 200 may also include a number of ticket servers 220. In an illustrative embodiment of the present invention, the ticket servers 220 are logically remote from the data warehouse 216. The ticket server 222 maintains a data warehouse identity database 222 that includes a number of data warehouse identity tickets. The data warehouse identity tickets includes information operable to identify and initialize a data warehouse 216 with which a given premises server 204 may interact. In an actual embodiment of the present invention the ticket server 222 provides a secure repository of the data warehouse tickets stored in ticket files.

In an actual embodiment of the present invention the various components of the fault tolerant data warehouse environment 200 may communicate via a global communication network, such as Internet 20. Alternatively, some or all of the components may communicate via private or semi-private communication networks.

Figure 3:
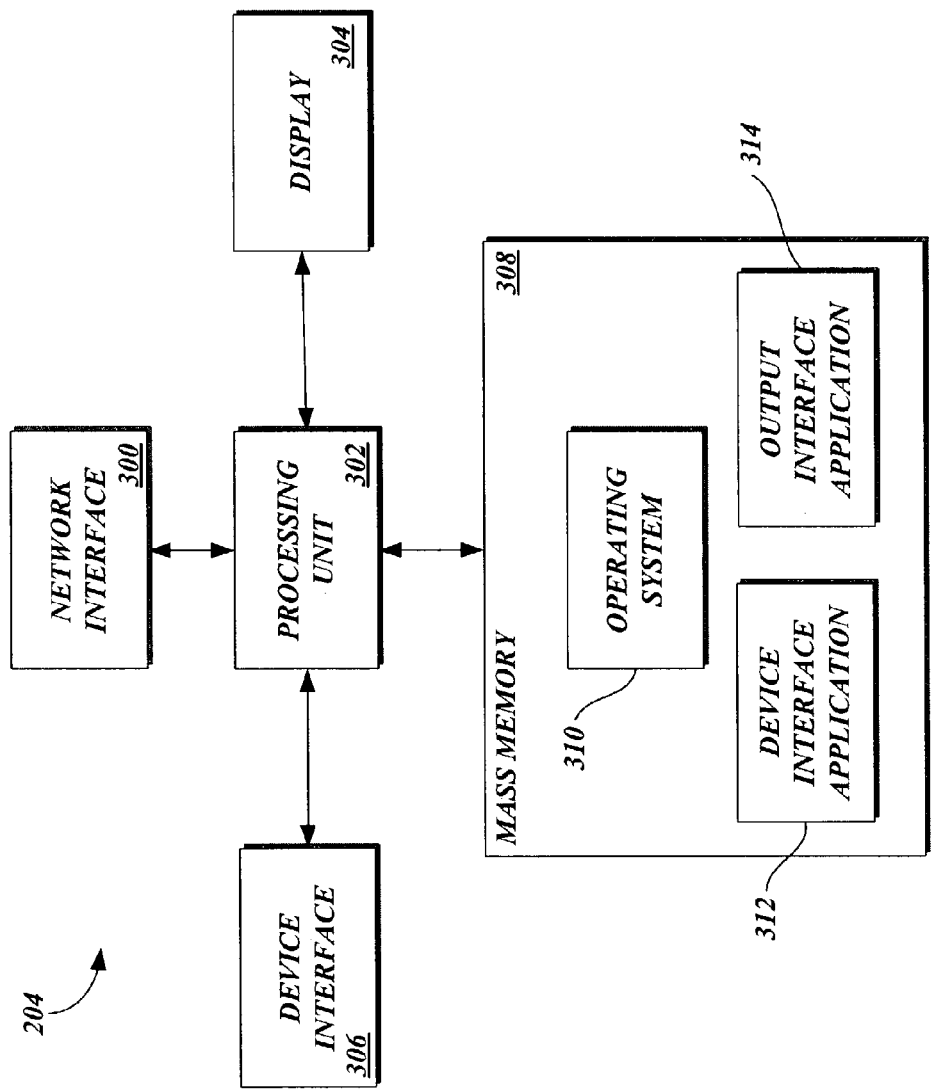
FIG. 3 is a block diagram depicting an illustrative premises server architecture formed in accordance with the present invention.

FIG. 3 is a block diagram depicting an illustrative architecture for a premises server 204. Those of ordinary skill in the art will appreciate that the premises server 204 includes many more components than those shown in FIG. 3. However, it is not necessary that all of these generally conventional components be shown in order to disclose an illustrative embodiment for practicing the present invention. As shown in FIG. 3, the premises server 204 includes a network interface 300 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 204 may also be equipped with a modem for connecting to the Internet through a point-to-point protocol ("PPP") connection or a serial-line Internet protocol ("SLIP") connection as known to those skilled in the art.

The premises server 204 also includes a processing unit 302, an optional display 304, a device interface 306 and a mass memory 308, all connected via a communication bus, or other communication device. The device interface 306 includes hardware and software components that facilitate interaction with a variety of the monitoring devices via a variety of communication protocols including TCP/IP, X10, digital I/O, RS-232, RS-485 and the like. Additionally, the device interface 306 facilitates communication via a variety of communication mediums including telephone land lines, wireless networks (including cellular, digital and radio networks), cable networks and the like. In an actual embodiment of the present invention, the device interface 306 is implemented as a layer between the server hardware and software applications utilized to control the individual monitoring devices. It will be understood by one skilled in the relevant art that alternative interface configurations may be practiced with the present invention.

The mass memory 308 generally comprises a RAM, ROM, and a permanent mass storage device, such as a hard disk drive, tape drive, optical drive, floppy disk drive, or combination thereof. The mass memory 308 stores an operating system 310 for controlling the operation of the premises server 204. It will be appreciated that this component may comprise a general-purpose server operating system as is known to those skilled in the art, such as UNIX, LINUX™, or Microsoft WINDOWS NT®.

The mass memory 308 also stores program code and data for interfacing with various monitoring devices 206 and for transmitting the monitoring device data. More specifically, the mass memory 308 stores a device interface application 312 in accordance with the present invention for obtaining monitoring device data from a variety of devices and for manipulating the data for processing. The device interface application 312 comprises computer-executable instructions which, when executed by the premises server 204 obtains and transmits device data as will be explained below in greater detail. The mass memory 308 also stores an output interface application program 314 for transmitting processed device data to one or more external system components, including the data warehouse 216 and the ticket server 222. The operation of the output interface application 314 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive 300.

Figure 4:
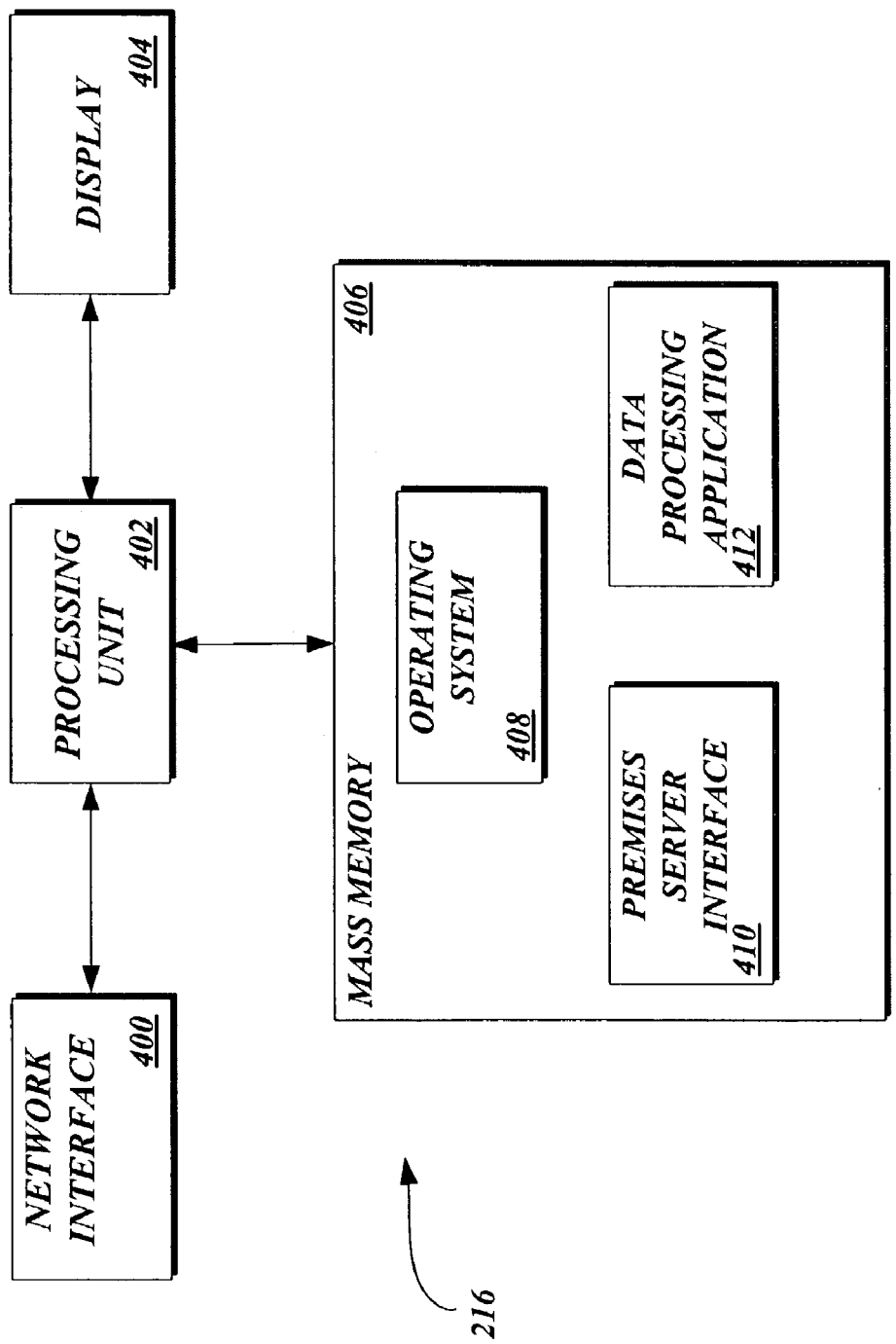
FIG. 4 is a block diagram depicting an illustrative data warehouse architecture formed in accordance with the present invention.

FIG. 4 is a block diagram depicting an illustrative architecture for a data warehouse 216. Those of ordinary skill in the art will appreciate that the data warehouse 216 includes many more components than those shown in FIG. 4. However, it is not necessary that all of these generally conventional components be shown in order to disclose an illustrative embodiment for practicing the present invention. The data warehouse 216 includes a network interface 400 for connecting directly to a LAN or a WAN, or for connecting remotely to a LAN or WAN. Those of ordinary skill in the art will appreciate that the network interface 400 includes the necessary circuitry for such a connection, and is also constructed for use with the TCP/IP protocol, the particular network configuration of the LAN or WAN it is connecting to, and a particular type of coupling medium.

The data warehouse 216 also includes a processing unit 402, an optional display 404 and a mass memory 406, all connected via a communication bus, or other communication device. The mass memory 406 generally comprises a RAM, ROM, and a permanent mass storage device, such as a hard disk drive, tape drive, optical drive, floppy disk drive, or combination thereof. The mass memory 406 stores an operating system 408 for controlling the operation of the data warehouse 216. It will be appreciated that this component may comprise a general-purpose server operating system.

The mass memory 406 also stores program code and data for interfacing with various premises servers 204 and processing the monitoring device data received from the premises servers. More specifically, the mass memory 406 stores a premises server interface application 410 in accordance with the present invention for communicating with a number of premises servers 204. The premises server interface application 410 includes computer-executable instructions that, when executed by the data warehouse 216 obtains and transmits device data as will be explained below in greater detail. The mass memory 406 also stores a data processing application 412 for processing data received by the data warehouse 416. The operation of the data processing application 412 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive 400.

Figure 5:
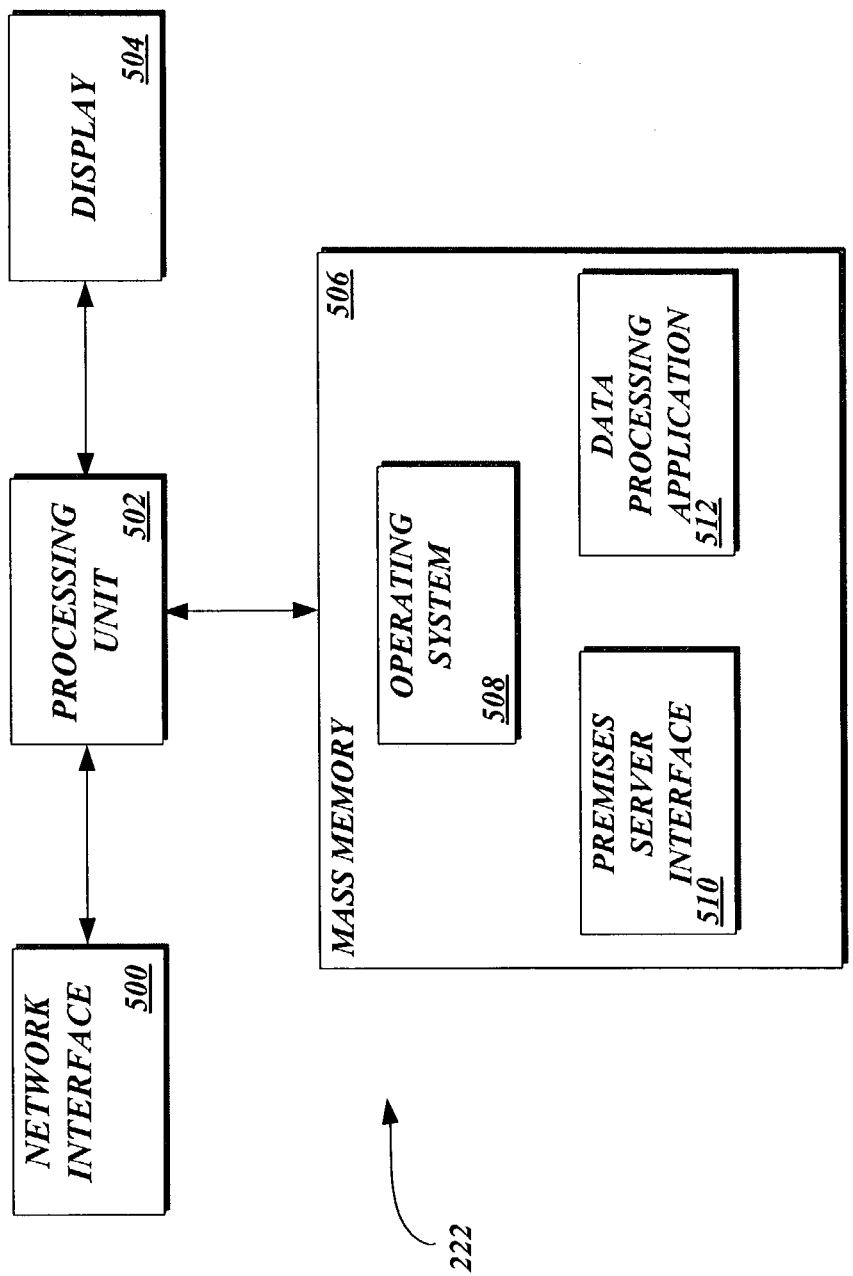
FIG. 5 is a block diagram depicting an illustrative ticket server architecture formed in accordance with the present invention.

FIG. 5 is a block diagram depicting an illustrative architecture for a ticket server 222. Those of ordinary skill in the art will appreciate that the ticket server 222 includes many more components then those shown in FIG. 5. However, it is not necessary that all of these generally conventional components be shown in order to disclose an illustrative embodiment for practicing the present invention. The ticket server 222 includes a network interface 500 for connecting directly to a LAN or a WAN, or for connecting remotely to a LAN or WAN. Those of ordinary skill in the art will appreciate that the network interface 500 includes the necessary circuitry for such a connection, and is also constructed for use with the TCP/IP protocol, the particular network configuration of the LAN or WAN it is connecting to, and a particular type of coupling medium.

The ticket server 222 also includes a processing unit 502, an optional display 504 and a mass memory 506, all connected via a communication bus, or other communication device. The mass memory 506 generally comprises a RAM, ROM, and a permanent mass storage device, such as a hard disk drive, tape drive, optical drive, floppy disk drive, or combination thereof. The mass memory 506 stores an operating system 508 for controlling the operation of the central server. It will be appreciated that this component may comprise a general-purpose server operating system.

The mass memory 506 also stores program code and data for interfacing with various premises servers 204 and associating a data warehouse for each premises server. More specifically, the mass memory 506 stores a premises server interface application 510 in accordance with the present invention for communicating with a number of premises servers 204. The premises server interface application 510 includes computer-executable instructions which, when executed by the data warehouse 216 obtains and transmits data warehouse assignments as will be explained below in greater detail. The mass memory 506 also stores a data processing application 512 for processing data warehouse assignments for a number of premises servers 204. The operation of the data processing application 512 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive 400.

In one aspect of the present invention, each premises server 204 is associated with at least one data warehouse 216 for transmitting monitoring device data for storage. In an illustrative embodiment of the present invention, a data warehouse 216 is designated as the primary data repository for a premises server 204. The premises server 204 may transmit data as it is generated by the various monitoring devices 205. Additionally, the premises server 204 may initiate a transfer of data upon the occurrence of a condition, such as a pre-established time period, or a detected event. The premises server 204 may encode the data to facilitate its transmission over the communication network 20. Additionally, the premises server 204 may also utilize various types of additional encoding for securing the transmission of data. One skilled in the relevant art will appreciate that transmission of data to a data warehouse 216 may include additional implementation details.

In accordance with the present invention, one or more events may occur that prevent a premises server 204 from transmitting data to a designated primary data warehouse 216. In one aspect of the present invention, hardware, software, and/or communication media errors may prevent a premises server 204 from establishing reliable communications with the designated primary data warehouse 216. For example, a data warehouse 216 may detect an error and attempt to transmit an error notification to its assigned premises servers 204. In another example, a premises server 204 may detect an inability to confirm the proper transmission of data and transmit an error notification to other premises servers. In another aspect of the present invention, one or more users from a client computer 214 may implement a reassignment of a data warehouse 216. For example, a system administrator may implement a reassignment of a data warehouse 216 to perform scheduled maintenance. As will be explained in greater detail below, upon the detection of an event that may prevent a premises server 204 from transmitting data, one or more premises servers 204 will be reassigned as alternative data warehouses to allow for the continuous processing of data by any number of premises servers in the fault tolerant data warehouse environment 200.

Figure 6A:
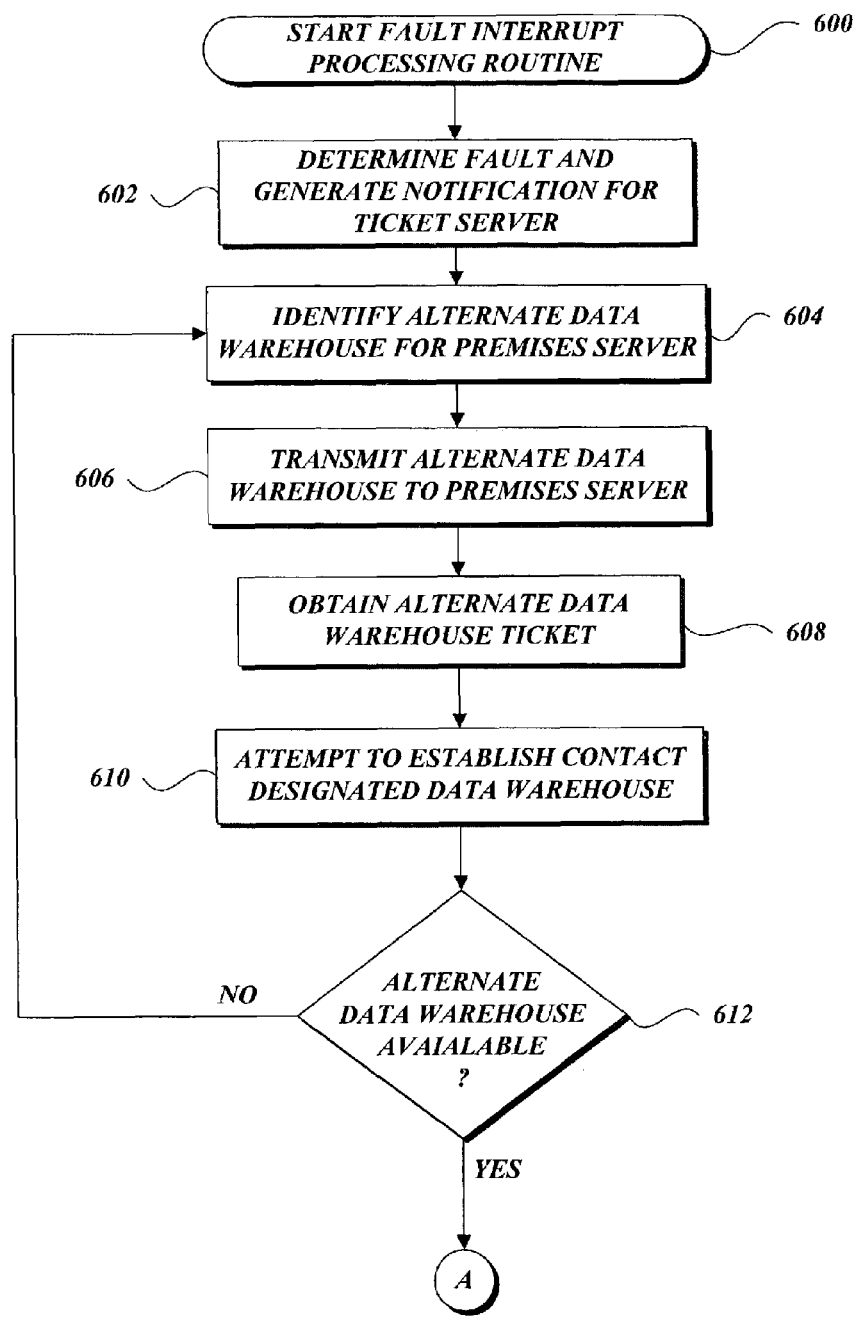
FIGS. 6A and 6B are flow diagrams of an illustrative fault-tolerant data warehouse process implemented in accordance with the present invention.
Figure 6B:
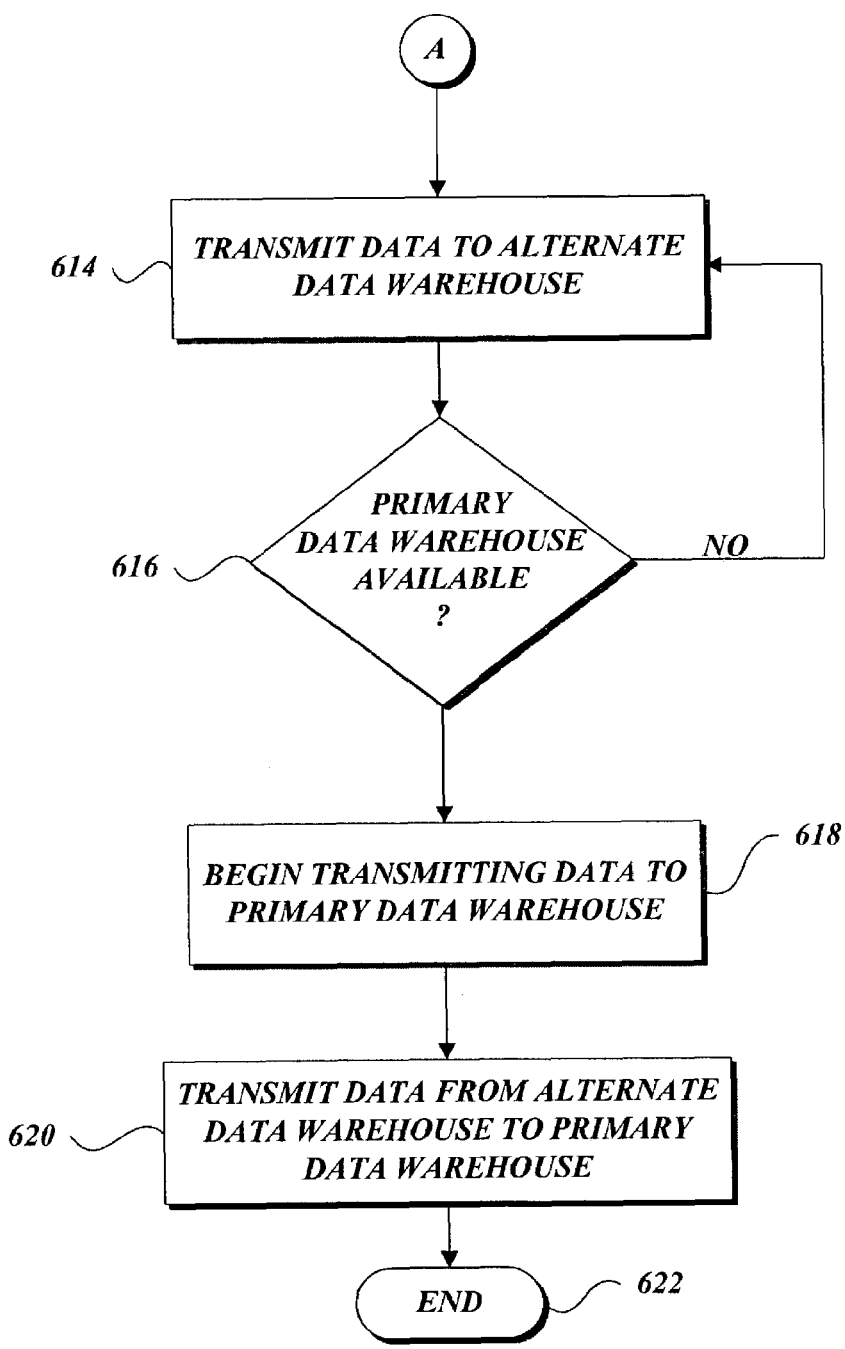

With reference now to FIGS. 6A and 6B, a routine 600 for the utilization of a fault tolerant data warehouse environment will be described. With reference to FIG. 6A, in response to a disruption between a premises server 204 and a data warehouse 216, at block 602, an error message is generated and sent to a ticket server 222. In an illustrative embodiment of the present invention, the error message may be generated by the data warehouse 216 upon the detection of an error condition. The error message may also be generated by the premises server 204 upon the detection of a fault. Still further, the error message may be generated by an authorized user, such as a system administrator, utilizing a client computer 214.

At block 604, the data processing application 512 of the ticket server 222 identifies an alternative data warehouse available for a given premises server 204 associated with the data warehouse 216. In an illustrative embodiment of the present invention, the data processing application 512 obtains a warehouse ticket file corresponding to the premises server 204 that indicates another premises server in the fault tolerant data warehouse environment 200 that will serve as an alternative data warehouse. The warehouse ticket file may be a static file that includes pre-assigned alternative premises servers 204. Alternatively, the warehouse ticket file may be dynamically generated based upon a variety of factors, including available memory resources of a variety of premises servers 204, communication network availability, and the like. In one embodiment, the warehouse ticket file may also indicate that a particular premises server 204 may serve as its own alternative data warehouse.

At block 606, the ticket server 222 transmits the identified alternative data warehouse to all applicable premises servers 204. In one embodiment of the present invention, the ticket server 222 may transmit an alternative data warehouse to a single premises server 204. Additionally, the ticket server 222 may transmit an alternative data warehouse to any number of premises servers 204 that are affected by the event. For example, if only a portion of the communication network is not available, the ticket server 222 may transmit alternative data warehouses for all premises servers 204 affected by the communication network unavailability.

At block 608, the premises server(s) obtain the transmitted data warehouse ticket and attempt to contact the designated alternate data warehouse at block 610. In an illustrative embodiment of the present invention, the warehouse ticket can include control and contact information that allows the premises server 204 to contact the alternate data warehouse. Additionally, the control and contact information may also include special processing information for a particular alternate data warehouse. Additionally, some or all of the control information may be stored in the warehouse control archive database 210. At decision block 612, a test is conducted to determine whether the alternate data warehouse is available. If the alternative data warehouse is not available, the routine 600 returns to block 604, where the ticket server 222 attempts to identify another alternate data warehouse. With reference to FIG. 6B, if the alternate data warehouse is available, the premises server 204 begins transmitting data to the alternate warehouse at block 614.

At decision block 616, a test is conducted to determine whether primary data warehouse 216 is available. In an illustrative embodiment of the present invention, the premises server 204 may periodically test the communication network to determine whether the primary data warehouse 216 is available. Alternatively, the data warehouse 216 may transmit a notification when it is available. If the primary data warehouse 216 remains unavailable, the routine 600 returns to block 614. If the primary data warehouse 216 is available, at block 618, the premises server 204 is instructed to begin transmitting data to the primary data warehouse. At block 620, the alternate data warehouse transmits the temporarily stored data to the primary data warehouse. At block 622, the routine 600 terminates.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a data collection and processing system including two or more premises servers for collecting data and transmitting the data to a primary data warehouse, a method for providing fault tolerant data warehousing, the method comprising:

obtaining a set of data to be transmitted to a primary data warehouse;

obtaining an indication that the primary data warehouse is inoperable to receive the set of data;

obtaining information identifying an alternate data warehouse to receive the set of data; and transmitting the set of data to the identified alternate data warehouse;

wherein the alternate data warehouse is selected from the two or more premises servers;

obtaining an indication that the primary data warehouse can receive data;

transmitting data to the primary data warehouse upon obtaining the indication; and suspending data transmission to the alternate data warehouse.

2. The method as recited in claim 1 further comprising obtaining information for initializing the alternate data warehouse, and initializing the designated alternate data warehouse prior to transmitting the set of data.

3. The method as recited in claim 1, wherein obtaining information identifying an alternate data warehouse includes:

transmitting a request to obtain an alternate data warehouse including one or more selection attributes; and obtaining information identifying an alternate data warehouse based upon a processing of the selection attributes.

4. The method as recited in claim 3, wherein the selection attributes correspond to the collected data.

5. The method as recited in claim 3, wherein the selection attributes correspond to the premises server transmitting the collected data.

6. The method as recited in claim 3, wherein obtaining information identifying an alternate data warehouse based upon a processing of the selection attributes includes obtaining a pre-assigned alternate data warehouse corresponding to the selection attributes.

7. The method as recited in claim 3, obtaining information identifying an alternate data warehouse based upon a processing of the selection attributes includes obtaining a dynamically assigned alternate data warehouse corresponding to the selection attributes.

8. The method as recited in claim 1, wherein the identified alternate data warehouse is not operable to receive data until being assigned as the alternate data warehouse.

9. The method as recited in claim 1, wherein transmitting the set of data to the identified alternate data warehouse includes storing the data locally as the identified alternate data warehouse.

10. A computer-readable medium having computer-executable instructions for performing the method recited in claim 1.

11. A computer system having a processor, a memory and an operating environment, the computer system operable to perform the method recited in claim 1.

12. In a data collection and processing system including two or more premises servers for collecting data and transmitting the data to a primary data warehouse, a method for providing fault tolerant data warehousing, the method comprising:

obtaining a set of data to be transmitted to a primary data warehouse;

obtaining an indication that the primary data warehouse is inoperable to receive the set of data;

accessing a database associated with a premises server to obtain an identification of an alternate data warehouse associated with the premises server;

suspending transmission of data between the premises server and the primary data warehouse;

transmitting premises data to the alternate data warehouse;

wherein the alternate data warehouse is selected from the two or more premises servers;

obtaining an indication that the primary data warehouse can receive data;

transmitting data to the primary data warehouse upon obtaining the indication; and suspending data transmission to the alternate data warehouse.

13. The method as recited in claim 1 further comprising accessing the database associated with a premises server to obtain information for initializing the alternate data warehouse from the database, and initializing the designated alternate data warehouse prior to transmitting the set of data.

14. The method as recited in claim 12, wherein accessing a database associated with a premises server to obtain an identification of an alternate data warehouse associated with the premises server includes:

transmitting a request to the obtain an alternate data warehouse including one or more selection attributes; and obtaining information identifying an alternate data warehouse based upon a processing of the selection attributes.

15. The method as recited in claim 14, wherein the selection attributes correspond to the premises data.

16. The method as recited in claim 14, wherein the selection attributes correspond to the premises server transmitting the premises data.

17. The method as recited in claim 14, wherein obtaining information identifying an alternate data warehouse based upon a processing of the selection attributes includes obtaining a pre-assigned alternate data warehouse corresponding to the selection attributes.

18. The method as recited in claim 14, obtaining information identifying an alternate data warehouse based upon a processing of the selection attributes includes obtaining a dynamically assigned alternate data warehouse corresponding to the selection attributes.

19. The method as recited in claim 12, wherein the identified alternate data warehouse is not operable to receive data until being assigned as the alternate data warehouse.

20. The method as recited in claim 12, wherein transmitting the set of data to the identified alternate data warehouse includes storing the premises data locally as the identified alternate data warehouse.

21. The method as recited in claim 12, wherein the database associated with a premises server is an external database common to all premises in the data collection and processing system.

22. A computer-readable medium having computer-executable instructions for performing the method recited in claim 12.

23. A computer system having a processor, a memory and an operating environment, the computer system operable to perform the method recited in claim 12.

24. A system for providing fault tolerant data warehousing comprising:

two or more premises servers in communication with a number of data generating devices, wherein the premises servers transmit collected data for storage;

a primary data warehouse for receiving the collected data from transmitted by the premises servers;

a database server in communication with the premises server for:

providing an identification of an alternate data warehouse upon a failure of the primary data warehouse;

causing data to be transmitted to the alternate data warehouse upon providing the identification of the failure;

providing an identification that the primary data warehouse can receive data;

suspending data transmission to the alternate data warehouse upon the identification that the primary data warehouse can receive data;

causing data to be transmitted to the primary data warehouse; and wherein the alternate data warehouse is selected from the two or more premises servers.

25. The system as recited in claim 24, wherein the premises server is logically remote from the alternate data warehouse prior to an identification of the alternate warehouse.

26. The system as recited in claim 24, wherein the primary data warehouse is physically remote from the alternate data warehouse.

27. The system as recited in claim 24, wherein the alternate data warehouse is preselected to correspond to a particular premises server.

28. The system as recited in claim 27, wherein the system includes at least two alternate data warehouses.

29. The system as recited in claim 24, wherein the alternate data warehouse is dynamically selected to correspond to a particular premises server.

30. The system as recited in claim 24, a premises server serves as its own alternate data warehouse.

* * * * *

UNITED STATES PATENT AND TRADEMARK OFFICE
CERTIFICATE OF CORRECTION

PATENT NO. : 7,254,640 B2
APPLICATION NO. : 10/411504
DATED : August 7, 2007
INVENTOR(S) : Bruce Alexander It is certified that error appears in the above-identified patent and that said Letters Patent is hereby corrected as shown below:

Title Page
[54], line 1, insert --A-- before "SYSTEM"

Column 11
Line 41, change "claim 3, obtaining" to --claim 3, wherein obtaining--

Column 12, Claim 14
Line 26, delete "the"
Line 43, change "claim 14, obtaining" to --claim 14, wherein obtaining--

Column 13, Claim 24
Line 5, delete "from"

Column 14, Claim 30
Line 18, change "claim 24, a" to --claim 24, wherein a--

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

PATENT NO. : 7,254,640 B2  Page 1 of 1
APPLICATION NO. : 10/411504
DATED : August 7, 2007
INVENTOR(S) : Bruce Alexander It is certified that error appears in the above-identified patent and that said Letters Patent is hereby corrected as shown below:

Title Page,
Item [54], Title, the word "A" (as inserted by Certificate of Correction issued August 25, 2009) should be deleted and title is to be reinstated to read -- SYSTEM FOR PROVIDING FAULT TOLERANT DATA WAREHOUSING ENVIRONMENT BY TEMPORARY TRANSMITTING DATA TO ALTERNATE DATA WAREHOUSE DURING AN INTERVAL OF PRIMARY DATA WAREHOUSE FAILURE --.

Signed and Sealed this

Fifteenth Day of September, 2009

David J. Kappos
*Director of the United States Patent and Trademark Office*